United States Patent [19]

Nicholson

[11] Patent Number: 4,554,002

[45] Date of Patent: Nov. 19, 1985

[54] BENEFICIATING WASTE SLUDGES FOR AGRICULTURAL USE AND PRODUCT MADE THEREBY

[75] Inventor: John P. Nicholson, Toledo, Ohio

[73] Assignee: N-Viro Energy Systems Ltd., Toledo, Ohio

[21] Appl. No.: 495,143

[22] Filed: May 16, 1983

[51] Int. Cl.$^4$ ............................................. C05F 3/00
[52] U.S. Cl. .................................................... 71/12
[58] Field of Search ................................... 71/12, 62

[56] References Cited

U.S. PATENT DOCUMENTS

| | | | |
|---|---|---|---|
| 1,672,584 | 6/1928 | Travers | 210/52 |
| 2,877,599 | 3/1959 | Hebestreet et al. | 71/12 X |
| 3,110,583 | 11/1963 | Richardson | 71/62 |
| 3,476,683 | 11/1969 | Liljegren | 71/12 X |
| 3,824,091 | 7/1974 | Holman | 71/12 |
| 4,028,130 | 6/1977 | Webster et al. | 106/120 |
| 4,226,712 | 10/1980 | Kamei | 71/12 X |
| 4,306,978 | 12/1981 | Wurtz | 71/12 X |

FOREIGN PATENT DOCUMENTS 3060 of 1871 United Kingdom .................... 71/12

OTHER PUBLICATIONS

Patricia A. Westphal, Journal Water Pollution Control Federation, vol. 55, No. 11, pp. 1381–1386, (1983).
G. Lee Christensen, Water/Engineering & Management, Dec. 1982.

*Primary Examiner*—G. L. Kaplan
*Attorney, Agent, or Firm*—Barnes, Kisselle, Raisch, Choate, Whittemore & Hulbert

[57] ABSTRACT

A method of beneficiating waste sludge which comprises mixing kiln dust with waste sludge, exposing the mixture at ambient temperature without compacting for a time sufficient to produce a disintegratable, friable product which can be applied to land as a soil conditioner.

19 Claims, No Drawings

BENEFICIATING WASTE SLUDGES FOR AGRICULTURAL USE AND PRODUCT MADE THEREBY

This invention relates to a method of beneficiating waste water treatment sludge and other human, animal, and poultry manures with kiln dust to facilitate land application of the waste.

BACKGROUND AND SUMMARY OF THE INVENTION

The development of clean water legislation has dramatically increased the amount of sludge residue from municiple waste water treatment plants. In the late 1960's and early 1970's, there was strong momentum toward treating these sludges by incineration. The energy crisis of 1974 and subsequent escalation of all energy sources makes incineration both costly and an unnecessary use of energy. It has long been clear to environmentalists, conservationists, and agronomists that the most desirable technology for sludge disposal was land farming utilization. The Resource Conservation and Recovery Act of 1976 committed the United States to a course of action to utilize waste materials in lieu of disposing of them whenever possible if economically feasible. The land farming of sludges has always represented the best economic opportunity in most cases. However, environmental, sociological, political and administrative concerns have created substantial roadblocks for widespread land farming. The Environmental Protective Agency (EPA) has reported that less than 30% of all waste water treatment sludge is land applied. The balance is either disposed in landfills or incinerated. The latter usually costs the community more than land farming. In addition, the inherent value of the sludge is lost to the community when landfilled or incinerated and additional environmental concerns are created.

Over the past 15 years, billions of dollars have been spent by federal, state, and local public bodies on improving and modernizing waste water treatment facilities.

In typical treatment facilities the sludge is developed as follows: The raw source enters the plant over grids, which remove large objects. It is then usually treated with alum to aid flocculation (lime can be used but a high pH at this point in the process is usually undesirable) and moved to the primary clarifier. Here the sludge (suspended particles) settles out. At this point, the sludge is separated from the effluent. Secondary and tertiary treatments of the effluent may produce additional sludge but most is generated during primary clarification.

If the sludge is to be stabilized (as it all should be), it now goes from the clarifier to the stabilization process. Many waste water treatment plants, which stabilize the sludge, use digestors—either anaerobic or aerobic for stabilization. The objective of stabilization is to reduce pathogens and volatile solids (organic materials) which in decay create offensive odors. The usual digestive period is from 15-30 days.

Other methods of stabilization are composting, heat and chemical stabilization which requires caustic materials to increase the pH of the sludge above 12 for at least two hours. This process destroys the pathogens. This technology is little used due to the high operating cost and unavailability of lime and other caustic materials such as soda ash and caustic soda.

After stabilization, many treatment facilities route the sludge to dewatering systems. The three primary systems currently being used are the vacuum filter system, the centrifuge system, and the belt pressure system. The sludges are pre-treated to aid in flocculation. Usually polyelectrolytes (polymers) are used, but some plants which use a vacuum filter dewatering system use lime-ferrous chloride combinations in lieu of polymers. While these materials may be more expensive than polymers in dewatering, the resultant high pH is an advantage in sludge disposal or utilization.

Some plants do not stabilize their sludge at all. The sludge is taken from the clarifier, dewatered, and hauled to landfills for disposal or hauled to incinerators.

Most waste water treatment sludge leaves the facility at a pH of about 7. If lime is used to precipitate or flocculate phosphorus, to chemically stabilize the sludge, or to pre-treat the sludge prior to dewatering with a vacuum filter, the pH will be significantly higher. There are many distinct advantages to a high pH sludge exiting the plant.

EPA publications and other published documents are almost unanimous in their discussions on the relative costs and problems associated with methods of sludge disposal other than land farming. Incineration costs have become especially prohibitive. Since 1973 the cost of a barrel of oil has increased tenfold. Conservation of both oil and gas have become congressionally determined national objectives. Incineration costs are now estimated at over $150 per dry ton or $30 per wet ton (20% solids).

Higher percentage solids sludges will cost less per dry ton and lower percentage solids will cost more per dry ton. The cost and wasted energy of evaporating water is prohibitive. With incineration, the nutrient and organic values of waste water treatment sludges are destroyed, ash disposal is a problem, and bacteria are released into the air. With incineration, 15-20 gallons of oil or 2500-3500 cubic feet of gas is used unnecessarily per wet ton.

Landfill costs and problems are not much better. Typical costs are running at least $20 per wet ton or $100 per dry ton (20% solids). Unstabilized sludges create serious environmental concerns relative to leaching and ground water contamination. Offensive odors at the treatment plant, in transit, and at the landfill operation are a serious concern. The use of good land to bury a valuable resource seems idiotic unless the sludge is unacceptable and untreatable. A typical patent directed to making landfill is U.S. Pat. No. 4,028,130.

The most reasonable approach to sludge disposal appears to be sludge utilization through land farming. The nutrient value of sludge and the organic value of sludge will vary depending upon the method used in processing it at the waste water treatment facility. The following publications discuss these values: Application of Sewage to Cropland, by Council for Agricultural Science and Technology; Report No. 64, November 1976. Research Bulletin 1079 (revised), by Ohio Agricultural Research and Development Center. Use of Sewage Sludge in Crop Production, Sommers, Nelson and Spies in *Energy Management in Agriculture*, a publication of the Cooperative Extension Service, Purdue University. Applications of Sludges and Wastewaters on Agricultural Land; A Planning and Educational Guide, Edited by Bernard D. Knezck and Robert H. Miller.

The aforementioned Research Bulletin 1079 has shown that practically all wastewater sludges will have a total value of at least $50 per dry ton. This value is derived from phosphate ($P_2O_5$), value about $0.018 lbs. (average percent per dry solids—5.7%); Nitrogen (approximately 67% organic nitrogen and 33% ammonia nitrogen), value about $0.15 lb. (average percent per dry solids—3.3%); Potash ($K_2O$) $0.10 lb. (average percent per dry ton—0.4%); and organic materials-average value per dry ton of at least $25.

It would seen that this would immediately result in use of sludges in agriculture. However, there are realistic environmental and sociological concerns. There are administrative management problems. There are private interest groups who do not want to see sludges utilized since such utilization creates competition for their fertilizer products. There are private interest groups who do not want to see incinerators or land fills shut down as the supply or operations of these facilities are their business. It has been easier for public leaders to obtain federal funding for capital expenditures such as incinerators (presently as much as 90% federal participation) than to develop methods and technology to utilize the sludge in a manner that is sociologically, environmentally and politically acceptable. It is thus necessary that public officials must be given the technology to satisfy these concerns.

The use of waste water treatment sludge in land farming has been limited by combinations of at least six realistic concerns and one sociological impediment:
1. Concern for virus or other pathogens in the sludge.
2. Concern that plants might accumulate heavy metals from the sludge.
3. Inability of responsible officials to insure liming of soil prior to receipt of sludge.
4. Concern of community—at waste treatment plant, in transit, and at the land farm site for offensive odors.
5. Runoff of sludge to surface waters, thus affecting quality of surface water and creating movement of sludge from applied field to neighboring community.
6. Leaching of chemical from sludge to ground water.
7. A sociological problem is created when farmers obtain the sludge for nothing. Their community reacts that the urban area is giving something away to a few, but the entire neighboring community takes the perceived risk and discomfort so that the urban area can solve its disposal problem. If the farmers were paying for a processed sludge, the resistance would be significantly reduced.

In accordance with the invention, the controlled addition of substantial monitored quantities of an industrial waste product (kiln dust from cement or lime plants) to waste water sludge either during the in-plant processing or after it has been processed at the treatment plant, can dramatically improve the characteristics of the sludge. Reasonable objections to land farming can be eliminated or significantly reduced. Kiln dust alone is an excellent, low cost, soil conditioner. Its fine particle size makes it difficult to distribute to the soil. When mixed with sludge, a process similar to lime soil modification results. The fine particles agglomerate during curing, forming a friable material readily granulated and easily land applied. The value added to the sludge can be redeemed by marketing the combined materials at bargain values to the agricultural community or the combined materials can be sold as a feed stock to the fertilizer industry.

In accordance with the invention, a mixture of waste water treatment sludge and kiln dust, a by-product of the cement and lime industry, are combined to produce an acceptable soil conditioner and partial fertilizer by eliminating or significantly reducing undesirable characteristics of each material considered separately. The mixture is permitted to cure until it is sufficiently cohesive so that it can be readily formed into granulated particles by shredding or crushing and the like. The resultant product is friable so that upon placement on the ground and exposed to the elements as in farming it will break down into small fine particles.

The soil conditioner will improve the workability of the soil, which will improve the water carrying capacity of the soil and which will increase the ion exchange capacity of the soil. The partial fertilizer will provide macro nutrients such as nitrogen, phosphorus, potassium, calcium, sulfur and magnesium and limited quantities of micro nutrients such as molybdenum, zinc and copper.

Difficulties of land applications of sewage sludge were discussed earlier. Problems associated with the migratory nature of sludge are particularly minimized by this invention. Concerns for fugitive dust associated with the land use of dry kiln dust are eliminated or drastically reduced by this invention.

Mixtures of sludge and kiln dust are determined based on the following considerations:
1. Kiln dust, though a by-product, is a costly resource and thus should only be used in sufficient quantity to achieve desired granulation and pH results.
2. Preferably approximately 70% of the mixture will be sludge and 30% kiln dust.
3. The percentage of kiln dust may be reduced by:
   a. Increasing the percentage of solids in the sludge.
   b. Using a kiln dust of higher reactivity.
   c. Beneficiating the dust by the addition of a caustic compound, i.e. $CA(OH)_2$ or $CAO$, (up to 15% of total dust).
   d. Increasing the curing time and/or temperature to produce the desired cohesiveness. This will vary depending on the needs of the waste water treatment plant and the climate.
4. Sufficient dust must be added to develop sufficient cohesiveness to achieve friability through granulation techniques in a time period acceptable to the appropriate waste water authority.

Two primary aspects of this invention are:
1. The ability of this friable mixture to be handled and stored and yet break down where exposed in the field to climatic conditions. This differs significantly with other solidification technology which has been developed primarily to achieve land fill disposal objectives, i.e. minimize leaching through development of structurally durable strength.
2. This mixture will maintain a desired non-acidic pH much longer than lime treated sludges due to the nature and percentages of alkaline material in the mixture. Calcium silicate reactions in the kiln dust will also minimize the availability of metal ions. A recent study by the United States Bureau of mines concludes cement kiln dust is a large volume material and a potential resource as a substitute for lime. Any environmental considerations are minor, as the results of this extensive survey show that United States cement kiln dust is not a hazardous waste as defined by current regulations. The blending of sludge and kiln dust will result in not only minimizing the availability of undesirable trace metals but in dilution as well.

Typical physical characterization test results for cement kiln dust are set forth in the following TABLE 1:

TABLE 1

PHYSICAL CHARACTERIZATION TEST RESULTS FOR CEMENT KILN DUSTS

| SAMPLE NUMBER | TOP SIZE | PARTICLE SIZE DISTRIBUTION PERCENT PASSING | | | | | | OTHER | | |
|---|---|---|---|---|---|---|---|---|---|---|
| | | 60 MESH | 200 MESH | 325 MESH | 0.02 mm | 0.01 mm | 0.006 mm | SG | BLAINE FINENESS | pH[c] |
| CD-1 | | 100 | 99 | 97.5 | 87.5 | 3 | | 2.76 | 9090 | 11.9 |
| CD-2 | #50 | 99.6 | 96.7 | 93 | 11 | 0.5 | | 2.78 | 4890 | 11.9 |
| CD-3 | #20 | 97.5 | 83.2 | 71 | 2.5 | 0 | | 2.78 | 5870 | 11.9 |
| CD-4 | #50 | 98.7 | 84 | 70 | 28 | | | 2.76 | 7190 | 11.9 |
| CD-5 | #14 | 97.2 | 71 | 50 | 14 | | | 2.87 | 7550 | 12.1 |
| CD-6 | #50 | 99.9 | 84 | 61 | 19 | | | 2.74 | 9980 | 12.1 |
| CD-7 | #50 | 98.7 | 86 | 76.5 | 35 | 0.3 | | 2.84 | 5120 | 11.9 |
| CD-8 | #50 | 98.6 | 72 | 52 | 21.5 | | | 2.84 | 4610 | 11.9 |
| CD-9 | #10 | 96.5 | 85.7 | 77 | 1.2 | 0.3 | 0 | 2.85 | 4940 | 12.0 |
| CD-10 | | | 100 | 97.5 | 76 | | | 2.79 | 10760 | 12.0 |
| CD-11 | #50 | 99.5 | 95.2 | 91.5 | 55 | 4.4 | 2.2 | 2.76 | 8130 | 11.8 |
| CD-12 | #50 | 99.9 | 94 | 89.5 | 77.5 | 44 | 19 | 2.74 | 10370 | 11.9 |
| CD-13 | #10 | 97.8 | 79.5 | 59.5 | 21.5 | | | 2.84 | 7110 | 11.9 |
| CD-14 | #50 | 98.6 | 80 | 68 | 38 | | | 2.78 | 6810 | 12.0 |
| CD-15 | #50 | 99 | 89 | 82 | 67 | 27 | 19.3 | 2.69 | 7090 | 11.5 |
| CD-16 | #50 | 99.5 | 94 | 88 | 63 | | | 2.77 | 8700 | 12.0 |
| CD-17 | #50 | 98.5 | 79.3 | 63 | 34.5 | | | 2.79 | 10010 | 12.1 |
| CD-18 | #50 | 99.5 | 97.4 | 96.3 | 80 | 3 | 1.3 | 2.74 | 9120 | 12.0 |
| CD-19 | #50 | 99.5 | 88.5 | 81.2 | | | | 2.85 | 5680 | 12.1 |
| CD-20 | #50 | 99.5 | 90 | 80 | 3.5 | | | 2.75 | 6090 | 12.1 |
| CD-21 | #50 | 97 | 78 | 66 | 4.5 | 0 | | 2.79 | 4460 | 12.1 |
| CD-22[a] | ½" (99.5%) | 32 | 12 | | | | | | | |
| CD-22[b] | #10 | 79 | 57.5 | 46.5 | 28 | 14 | 8.5 | 2.60 | 3740 | 11.8 |
| CD-23[a] | ½" (95%) | 11 | 2 | | | | | | | |
| CD-23[b] | #10 | 76 | 57 | 41 | 29.5 | 22 | 16.8 | 2.78 | 13900 | 11.2 |
| CD-23 | #50 | 99.5 | 85.5 | 68 | | | | 2.93 | 5630 | 12.0 |
| CD-25 | | | 100 | 97.5 | 86.5 | 0 | | 2.70 | 13060 | 12.0 |
| CD-26 | ¾" | 29.5 | 17.5 | 12.5 | 9 | 2.5 | 1.3 | 2.48 | 6950 | 12.0 |
| CD-27 | #50 | 99.5 | 86 | 72 | 25 | 0 | | 2.79 | 5520 | 12.0 |
| CD-28 | #50 | 99.6 | 98 | 95.6 | 4.7 | 3 | | 2.86 | 7370 | 12.1 |
| CD-29 | #50 | 99 | 86 | 79 | | | | 2.83 | 5600 | 12.0 |
| CD-30 | #100 | | 98.8 | 97.7 | 80 | 2.5 | 1.8 | 2.76 | 8780 | 11.9 |
| Calcitic Hydrated Lime | | | 100 | 98 | 91 | 0 | | 2.31 | | |

Notes:
[a]As received.
[b]Ground.
[c]15 gm in 150 ml distilled, deionized water, stirred 1 minute, pH of slurry, (pH of water 7.8).

Typical chemical characterization test results for cement kiln dust are set forth in the following TABLE 2:

TABLE 2

CHEMICAL CHARACTERIZATION TEST RESULTS FOR CEMENT KILN DUSTS PERCENT

| SAMPLE NUMBER | CaO | $SiO_2$ | $Al_2O_3$ | MgO | $Na_2O$ | $K_2O$ | $Fe_2O_3$ | MnO | $TiO_2$ | $P_2O_5$ | $SO_3$ LECO | LOI 1050° C. | OXIDE TOTAL | LOI 150° C. | LOI 550° C. | TOTAL CARBON | $CO_2$ |
|---|---|---|---|---|---|---|---|---|---|---|---|---|---|---|---|---|---|
| CD-1 | 38.3 | 13.2 | 4.61 | 2.49 | 0.15 | 3.96 | 2.32 | 0.12 | 0.20 | 0.16 | 6.74 | 25.3 | 97.6 | <0.1 | 0.87 | 6.77 | 24.8 |
| CD-2 | 44.5 | 17.1 | 4.84 | 1.15 | 0.27 | 2.91 | 1.97 | 0.00 | 0.18 | 0.12 | 3.82 | 22.8 | 99.7 | 0.1 | 1.71 | 5.97 | 21.9 |
| CD-3 | 39.1 | 15.4 | 2.93 | 2.63 | 0.55 | 3.52 | 2.13 | 0.00 | 0.18 | 0.06 | 8.56 | 22.8 | 97.9 | 0.1 | 0.93 | 6.19 | 22.7 |
| CD-4 | 37.2 | 12.5 | 4.18 | 2.02 | 0.68 | 4.70 | 1.51 | 0.02 | 0.15 | 0.16 | 6.79 | 27.3 | 97.3 | 0.1 | 1.99 | 6.79 | 24.9 |
| CD-5 | 38.0 | 15.3 | 4.25 | 0.91 | 0.32 | 7.30 | 1.83 | 0.10 | 0.13 | 0.15 | 7.94 | 19.6 | 95.8 | 0.1 | 2.13 | 5.21 | 19.1 |
| CD-6 | 25.8 | 9.71 | 2.21 | 1.13 | 1.35 | 15.3 | 1.77 | 0.01 | 0.10 | 0.04 | 17.40 | 19.5 | 94.2 | <0.1 | 3.12 | 5.47 | 20.1 |
| CD-7 | 41.9 | 16.2 | 4.11 | 1.64 | 0.34 | 3.22 | 2.39 | 0.06 | 0.18 | 0.24 | 4.79 | 22.9 | 98.0 | 0.2 | 2.35 | 6.14 | 22.5 |
| CD-8 | 39.4 | 17.7 | 4.07 | 0.92 | 1.20 | 3.90 | 2.84 | 0.00 | 0.16 | 0.07 | 3.47 | 22.7 | 96.5 | 0.2 | 2.03 | 5.11 | 18.7 |
| CD-9 | 41.6 | 20.0 | 5.76 | 2.22 | 0.41 | 3.76 | 2.46 | 0.01 | 0.27 | 0.11 | 6.69 | 12.7 | 95.9 | <0.1 | 1.24 | 3.16 | 11.6 |
| | | | | | | | | | | | | | | | | 7.85 | 28.8 |
| CD-10 | 45.9 | 11.9 | 2.92 | 1.39 | 0.07 | 1.54 | 2.04 | 0.01 | 0.14 | 0.06 | 6.24 | 28.2 | 100.3 | 0.1 | 1.29 | 7.70 | 28.2 |
| | | | | | | | | | | | | | | | | 6.46 | 23.7 |
| CD-11 | 40.8 | 13.3 | 4.85 | 1.02 | 0.27 | 2.90 | 2.26 | 0.00 | 0.21 | 0.10 | 6.24 | 25.6 | 97.5 | <0.1 | 1.82 | 6.48 | 23.8 |
| CD-12 | 44.4 | 12.0 | 3.13 | 1.66 | 0.08 | 2.86 | 1.27 | 0.00 | 0.12 | 0.05 | 3.30 | 31.8 | 100.6 | <0.1 | 2.50 | 8.67 | 31.8 |
| CD-13 | 45.2 | 16.8 | 3.88 | 1.37 | 0.18 | 1.78 | 2.11 | 0.00 | 0.18 | 0.24 | 3.72 | 23.2 | 98.7 | 0.1 | 1.67 | 6.21 | 22.8 |
| CD-14 | 34.6 | 15.1 | 4.24 | 1.83 | 0.58 | 7.05 | 2.06 | 0.02 | 0.21 | 0.07 | 8.64 | 22.9 | 97.2 | 0.2 | 2.82 | 5.85 | 21.4 |
| | | | | | | | | | | | | | | | | | 21.3 |

TABLE 2-continued

CHEMICAL CHARACTERIZATION TEST RESULTS FOR CEMENT KILN DUSTS
PERCENT

| SAMPLE NUMBER | CaO | SiO$_2$ | Al$_2$O$_3$ | MgO | Na$_2$O | K$_2$O | Fe$_2$O$_3$ | MnO | TiO$_2$ | P$_2$O$_5$ | SO$_3$ LECO | LOI 1050° C. | OXIDE TOTAL | LOI 150° C. | LOI 550° C. | TOTAL CARBON | CO$_2$ |
|---|---|---|---|---|---|---|---|---|---|---|---|---|---|---|---|---|---|
| CD-15 | 19.4 | 22.4 | 10.0 | 0.64 | 1.34 | 14.1 | 4.06 | 0.01 | 0.42 | 0.19 | 10.14 | 13.2 | 96.0 | 0.1 | 3.88 | 3.37 | 12.4 |
| CD-16 | 37.4 | 15.2 | 4.75 | 1.96 | 0.48 | 5.03 | 2.78 | 0.02 | 0.21 | 0.06 | 6.37 | 24.0 | 98.3 | 0.1 | 1.77 | 6.39 | 23.4 |
| CD-17 | 26.8 | 13.0 | 4.50 | 0.54 | 1.47 | 12.4 | 2.04 | 0.13 | 0.18 | 0.15 | 16.93 | 13.5 | 91.8 | 0.1 | 2.19 | 3.48 | 12.8 |
| CD-18 | 47.6 | 9.91 | 3.08 | 1.33 | 0.11 | 1.08 | 1.21 | 0.00 | 0.11 | 0.04 | 2.92 | 31.6 | 99.0 | 0.1 | 1.00 | 8.59 | 31.5 |
| CD-19 | 41.1 | 15.2 | 3.92 | 1.30 | 0.20 | 3.39 | 2.19 | 0.02 | 0.16 | 0.08 | 13.76 | 11.7 | 93.0 | <0.1 | 0.54 | 3.13 | 11.5 |
| CD-20 | 45.5 | 14.0 | 3.39 | 1.16 | 0.28 | 2.50 | 1.26 | 0.00 | 0.14 | 0.05 | 2.40 | 28.4 | 99.3 | 0.3 | 1.12 | 7.52 | 27.6 |
| CD-21 | 42.9 | 14.9 | 4.62 | 0.89 | 0.14 | 3.16 | 2.31 | 0.00 | 0.19 | 0.27 | 5.54 | 22.2 | 97.0 | 0.3 | 1.20 | 6.26 | 23.0 |
| CD-22 | 39.6 | 17.6 | 4.42 | 2.04 | 0.20 | 2.60 | 2.04 | 0.01 | 0.21 | 0.09 | 3.75 | 26.6 | 99.3 | 2.8 | 6.73 | 5.60 | 20.6 |
| CD-23 | 31.4 | 11.7 | 3.18 | 0.97 | 0.13 | 1.65 | 2.16 | 0.01 | 0.15 | 0.07 | 8.24 | 40.4 | 100.0 | 1.8 | 11.85 3.81 14.0 | | |
| CD-24 | 57.1 | 9.70 | 4.18 | 1.81 | 0.00 | 0.22 | 0.24 | 0.00 | 0.15 | 0.03 | 2.67 | 21.1 | 97.2 | <0.1 | 1.08 | 5.52 | 20.2 |
| CD-25[a] | | | | | | | | | | | | | | | 2.60 | | |
| CD-26 | 44.2 | 11.9 | 3.24 | 1.73 | 0.27 | 2.92 | 1.45 | 0.02 | 0.14 | 0.12 | 2.40 | 30.2 | 98.5 | 2.3 | 9.03 | 5.48 | 20.1 |
| CD-27 | 42.5 | 14.3 | 3.34 | 2.09 | 0.44 | 5.21 | 1.82 | 0.03 | 0.13 | 0.09 | 3.10 | 23.8 | 96.9 | 0.1 | 1.48 | 6.04 6.12 | 22.3 22.4 |
| CD-28 | 49.7 | 13.2 | 3.24 | 1.73 | 0.40 | 4.03 | 1.48 | 0.04 | 0.13 | 0.12 | 3.02 | 18.7 | 95.0 | <0.1 | 0.97 | 4.96 4.91 | 18.2 18.0 |
| CD-29 | 47.5 | 14.3 | 3.03 | 1.20 | 0.30 | 2.02 | 1.93 | 0.01 | 0.12 | 0.05 | 3.20 | 24.1 | 97.8 | <0.1 | 0.81 | 6.35 | 23.3 |
| CD-30 | 43.0 | 16.0 | 3.97 | 3.28 | 0.28 | 2.09 | 2.20 | 0.01 | 0.28 | 0.22 | 2.15 | 27.1 | 100.6 | 0.1 | 1.42 | 6.70 | 24.6 |

NOTE:
[a]Testing to be completed.

Typical pH characterization test results for lime kiln dust are set forth in the following TABLE 3:

TABLE 3

PHYSICAL CHARACTERIZATION TEST RESULTS FOR LIME KILN DUSTS

| | | PARTICLE SIZE DISTRIBUTION PERCENT PASSING | | | | | | | OTHER | |
|---|---|---|---|---|---|---|---|---|---|---|
| SAMPLE NUMBER | TOP SIZE | 60 MESH | 200 MESH | 325 MESH | 0.02 mm | 0.06 mm | 0.001 mm | SG | BLAINE FINENESS | pH[b] |
| LD-1 | #20 | 99.5 | 89.3 | 73 | 0 | | | 2.96 | 2920 | 12.0 |
| LD-2 | #50 | 99.7 | 86.5 | 40 | | | | 2.85 | 5180 | 12.0 |
| LD-3 | #10 | 90.5 | 78.3 | 65 | | | | 2.87 | 3650 | 11.9 |
| LD-4 | | | 100 | 98 | .49 | | | 2.73 | 10350 | 12.0 |
| LD-5 | #10 | 92.3 | 49.5 | 4 | | | | 2.89 | 1310 | 12.0 |
| LD-6 | #10 | 98.9 | 88.5 | 69 | | | | 2.83 | 2180 | 12.0 |
| LD-7 | #10 | 97 | 79 | 56 | | | | 2.93 | 1870 | 12.0 |
| LD-8[a] | | | | | | | | | | |
| LD-9[a] | | | | | | | | | | |
| LD-10 | #50 | 98.5 | 62.5 | 43 | 23.3 | 13 | 7.6 | 2.98 | 2090 | 12.0 |
| LD-11 | #10 | 84.8 | 74 | 56 | | | | 3.04 | 1750 | 12.0 |
| LD-12 | #10 (99.5%) | 80.5 | 57 | 43 | 19.5 | 4.5 | | 2.83 | 2630 | 11.9 |

NOTES:
[a]Testing to be completed.
[b]15 gm in 150 ml distilled, deionized water; stirred 1 minute. pH of slurry. (pH of water 7.8).

Typical chemical characterization test results for lime kiln dust are set forth in the following TABLE 4:

TABLE 4

CHEMICAL CHARACTERIZATION TEST RESULTS FOR LIME KILN DUSTS
PERCENT

| SAMPLE NUMBER | CaO | SiO$_2$ | Al$_2$O$_3$ | MgO | Na$_2$O | K$_2$O | Fe$_2$O$_3$ | MnO | TiO$_2$ | P$_2$O$_5$ | SO$_3$ LECO | LOI 1050° C. | OXIDE TOTAL | LOI 105° C. | LOI 550° C. | TOTAL CARBON | CO$_2$ |
|---|---|---|---|---|---|---|---|---|---|---|---|---|---|---|---|---|---|
| LD-1 | 28.5 | 9.19 | 5.27 | 20.5 | 0.21 | 0.49 | 6.82 | 0.03 | 0.53 | 0.13 | 6.37 | 18.2 | 96.2 | 0.1 | +1.01[b] +0.95 | 5.13 | 18.8 |
| LD-2 | 31.2 | 2.46 | 0.74 | 23.5 | 0.00 | 0.09 | 0.94 | 0.00 | 0.05 | 0.03 | 2.80 | 37.4 | 99.3 | <0.1 | 7.73 | 10.36 | 37.0 |
| LD-3 | 54.5 | 9.94 | 4.16 | 0.49 | 0.03 | 0.22 | 1.98 | 0.00 | 0.17 | 0.08 | 7.97 | 14.2 | 93.8 | <0.1 | 1.07 | 3.61 | 13.2 |
| LD-4 | 44.3 | 10.1 | 4.92 | 3.56 | 0.14 | 0.38 | 1.36 | 0.00 | 0.24 | 0.10 | 4.84 | 27.5 | 97.4 | 0.2 | 0.66 | 6.56 | 24.1 |
| LD-5 | 66.1 | 1.92 | 0.48 | 2.16 | 0.00 | 0.13 | 0.43 | 0.00 | 0.03 | 0.09 | 1.72 | 19.6 | 92.6 | <0.1 | 1.21 | 5.11 | 18.7 |
| LD-6 | 56.7 | 3.45 | 1.83 | 1.11 | 0.00 | 0.21 | 0.80 | 0.00 | 0.06 | 0.03 | 0.27 | 34.4 | 98.9 | <0.1 | +0.91[b] +0.11 | 11.40 | 41.8 |
| LD-7 | 58.0 | 3.21 | 1.18 | 0.43 | 0.00 | 0.10 | 3.48 | 0.00 | 0.03 | 0.03 | 2.20 | 27.6 | 96.3 | <0.1 | 0.38 | 9.71 | 35.6 |
| LD-8[a] | | | | | | | | | | | | | | | | | |
| LD-9[a] | | | | | | | | | | | | | | | | | |
| LD-10 | 35.6 | 0.62 | 0.06 | 23.8 | 0.00 | 0.00 | 0.56 | 0.02 | 0.01 | 0.06 | 0.87 | 36.2 | 97.8 | 0.1 | 0.33 | 9.96 | 36.5 |
| LD-11 | 62.4 | 12.7 | 4.85 | 0.70 | 0.09 | 0.19 | 1.36 | 0.00 | 0.21 | 0.04 | 2.05 | 8.47 | 93.1 | <0.1 | 1.50 | 2.30 | 8.4 |

TABLE 4-continued

CHEMICAL CHARACTERIZATION TEST RESULTS FOR LIME KILN DUSTS
PERCENT

| SAMPLE NUMBER | CaO | SiO$_2$ | Al$_2$O$_3$ | MgO | Na$_2$O | K$_2$O | Fe$_2$O$_3$ | MnO | TiO$_2$ | P$_2$O$_5$ | SO$_3$ LECO | LOI 1050°C | OXIDE TOTAL | LOI 105°C | LOI 550°C | TOTAL CARBON | CO$_2$ |
|---|---|---|---|---|---|---|---|---|---|---|---|---|---|---|---|---|---|
| LD-12 | 35.1 | 6.41 | 1.41 | 21.5 | 0.02 | 0.12 | 0.75 | 0.00 | 0.07 | 0.05 | 0.05 | 35.3 | 100.8 | 0.1 | 6.78 | 8.66 | 31.8 |

NOTES:
<sup>a</sup>Testing to be completed.
<sup>b</sup>Plus sign indicates gain in weight.

The addition of kiln dust to waste water treatment sludge beneficiates the sludge in many ways:

1. The pH of the combined materials will rise significantly thus providing vastly increased pathogen removal.
2. The high pH of the combined materials will result in the precipitation of heavy metals in the sludge. This fixation process reduces concern that these elements will go into solution in the soil and thus penetrate the plants.
3. The inability of responsible officials to monitor preliming requirements prior to distribution of sludge on most farmlands has been a constant concern of agricultural, environmental, and waste water treatment officials. The blending of kiln dust and sludge eliminates that concern.
4. The blending of kiln dust, a high lime product, with sludge greatly reduces offensive odors at the treatment plant, in transit, and on the field.
5. A great concern in past sludge land farming applications has been the danger of water run-off to adjacent ditches, streams, areas, etc., causing public outcry. The granulation of the sludge through the blending with kiln dust eliminates this concern.
6. Leaching of sludges, particularly in sandy soils, has previously created concern for ground water contamination. The granulation by blending with kiln dust minimizes these concerns.
7. The granulated material is much more easily land applied than either the current sludge cake or liquid sludge. It facilitates storing for seasonal application.
8. The value added to waste water treatment sludge by blending kiln dust with the sludge creates a combined material with significant economic value without the many environmental and sociological problems of sludge by itself. As such, the product can be sold thus minimizing the often heard complaint that certain farmers are "getting something for nothing at the community's expense".

Kiln dust has excellent compounds for soil conditioning and partial fertilizing. However, due to its extremely fine particle size, it is very difficult to handle and distribute to soils. By blending with waste water treatment sludge, it becomes an important part of a system which can readily be distributed on farm land without generating air pollution (so-called fugitive dust).

In order to solidify some waste water treatment sludges in friable particles, it may be desirable to add fly ash, another industrial waste product, in small quantities.

Additives such as nitrogen, phosphorus and magnesium can easily be incorporated at a blending facility to improve the characteristics and marketability of the blended sludge and dusts.

The same solification and beneficiation technology discussed herein can be applied to other forms of human, animal, and poultry waste. Kiln dust can be added to septic tank wastes, animal and poultry manure to raise the pH, to dry the material, to reduce offensive characteristics and to improve both the physical and chemical characteristics.

The addition of kiln dust to waste water treatment, septic tank waste, or animal and poultry waste will create one problem. The raising of the pH of the combined materials above 9 will cause the release of ammonia. In waste water treatment plants, this is a common occurance where lime is utilized. This can be corrected by adding a balancing, lower pH material such as calcium sulphate or a bituminous fly ash. However, the positive effects of high pH in most cases will be more important than the loss of ammonia.

An important aspect of the invention is the ability to treat sludge in such a way as to granulate the material making it possible to be easily spread without run-off to surface water and ground water. This prevents migration of the sludge, which is an important sociological and environmental concern.

However, as the process will differ depending upon types of sludge, types of shredding equipment, value of sludge/dust combinations, needs of soils, etc., no firm gradation specifications are realistically possible or practical.

Basically, the method comprises mixing between 10% and 50% kiln dust by dry weight with waste water treatment sludge to achieve sufficient solidification so that shredding of the combined material will result in a granular mixture capable of spreading without emitting fugitive dust and/or migratory liquids.

This combined material will have a pH in excess of 9, so that available heavy metals are precipitated or made insoluble, so that odor is reduced, so that pathogens are further reduced.

This combined material will have significant percentages of calcium and phosphates and beneficial percentages of nitrogen, sulphur, potassium, and in some cases, magnesium.

Preferably, the process comprises mixing from 10% to 50% kiln dust (either lime or cement, old or new) with from 90% to 50% waste water treatment sludge, curing the mixture at ambient temperatures at least three days or preferably until it achieves sufficient cohesiveness to be granulated, shredded, crushed, etc., into particles resembling a bank run sand and gravel mixture. Exact mixtures will vary with percent solids of sludge, time allowed for curing, pH requirement, and reactivity of kiln dust.

Preferably, sufficient kiln dust or a combination of kiln dust and caustic material (up to 15% of the kiln dusts) is provided to generate a pH in excess of 12 for at least two hours to meet EPA criteria for "a process to reduce pathogens".

If the pH is raised to in excess of 10, it has been found that the resultant product will maintain a pH above 6.5 for extended periods of time such as 90 days or more.

It has been further found that the mixture can be beneficiated by the addition of fine dolomitic limestone in sufficient quantity to supply magnesium to the soil and improve the workability of the mixture.

In addition to use directly in farming, the resultant product can also be used as feed stock in fertilizer blends. When used in this manner, it may be necessary to reduce the moisture content further. In some cases, it will be beneficial to add nitric acid to the kiln dust and sludge combination. The use of the kiln dust provides an excellent carrier which will minimize crystal growth of calcium nitrate by preventing crystals from contacting each other. This same process may be usable and beneficial without the use of sludge. Previously, the "caking" effect of calcium nitrate has prevented its use in the United States.*

*Boynton: Lime and Limestone

EXAMPLE I

Nine mixtures of cement kiln dust or lime kiln dust and untreated waste water treatment sludge from Detroit, Mich., were made and were tested for pH values and for moisture content. Five additional mixtures of kiln dust and sludge with additions of fly ash and/or powdered $Ca(OH)_2$ were also made and tested. Two control samples of only sludge were also tested. One control sample refers to the six mixtures on one date, the other control refers to the eight mixtures made 3.4 and 7 days later.

Three pound mixtures of kiln dust and sludge (and fly ash and $Ca(OH)_2$ if used) were thoroughly blended using the paddle attached to the planetary drive of the mixer. Mixing time was three minutes. The mixture was placed into waxed cardboard cylinders 6 inches in diameter by 12 inches high. These containers were open at the top to allow some air circulation.

Immediately after mixing, the samples for the initial pH measurement and the initial moisture determination were taken. Additional samples for pH and moisture determination were taken from the storage container at 4, 72 and 168 hours after mixing.

To minimize the strong, objectionable odor associated with the sludge, the waxed containers holding the mixtures and the small oven used to dry the moisture samples were placed inside the large double-door curing oven. The oven had previously been connected to the blower venting the hood. By keeping the doors partially open and the hood blower running, a draft was induced which carried away much of the odor and most of the heat from the drying oven. However, because the drying oven was inside the larger oven, it is probable that the containers stored nearest the small oven were slightly warmer than those farther away from it. A heat effect such as this could explain the large decrease in moisture content of the control sample of the fourth day.

The pH and moisture samples were taken from the cylindrical containers 4, 72 and 168 hours after mixing. A slurry of 50% by weight distilled, deionized water was used to measure the pH. The pH value was recorded after the pH electrode had been immersed in the continuously stirred slurry for five minutes.

About 200 grams of mixture was used for moisture determination. After drying at least two days at 105° C., the moisture contents were calculated on a wet basis by the following formula:

Percent Moisture (Wet Basis) =

$$\frac{\text{Weight of wet sample in container} - \text{Weight of dry sample in container}}{\text{Weight of wet sample in container} - \text{Weight of container}} \cdot 100$$

Table 5 lists the weight percentages of kiln dust, fly ash, calcium hydroxide, and untreated waste water treatment sludge. It also lists the pH values of water slurries of the mixtures and the moisture contents of the mixtures.

Table 6 lists the percentage changes from the initial moisture contents. This percentage change was calculated from the following formula:

Percentage change from initial moisture content =

$$\frac{\text{Moisture content at time} - \text{Initial moisture content}}{\text{Initial Moisture Content}} \cdot 100$$

Because the sludge content of the mixtures varied from 58.5% to 70%, the initial moisture content changed. Using the percentage change from the initial mixture content should compensate for the unequal initial moisture contents.

TABLE 5 pH VALUES OF WATER SLURRIES OF KILN DUST - FLY ASH - SLUDGE MIXTURES AND MOISTURE CONTENTS OF THESE MIXTURES

| Source of Kiln Dust | Percentage of | | | | pH Values of Slurry of 50% by Weight Kiln Dust - Sludge Mixture and 50% by Weight Water | | | | Moisture Content (%) Wet Basis | | | |
|---|---|---|---|---|---|---|---|---|---|---|---|---|
| | Kiln Dust in Mixture | Trenton Channel Fly Ash in Mixture | Admixture in Mixture | Sludge in Mixture | Initial | 4 Hours | 72 Hours | 7 Days | Initial | 4 Hours | 72 Hours | 7 Days |
| No. 1 | 30 | None | None | 70 | 11.82 | 12.15 | 12.36 | 11.87 | 55.6 | 55.1 | 50.5 | 46.6 |
| No. 2 | 30 | None | None | 70 | 10.57 | 11.32 | 11.42 | 10.17 | 56.5 | 55.3 | 51.4 | 45.5 |
| No. 3 | 30 | None | None | 70 | 11.85 | 11.23 | 10.24 | 11.35 | 56.2 | 55.3 | 50.2 | 43.4 |
| No. 4 | 30 | None | None | 70 | 12.31 | 11.68 | 10.45 | 11.82 | 56.8 | 55.7 | 52.3 | 46.7 |
| No. 4 | 30 | None | 1.5 | 68.5 | 11.58 | 11.65 | 10.18 | 11.88 | 53.8 | 56.4 | 51.7 | 45.8 |
| No. 4 | 30 | None | 2.5 | 67.5 | 11.46 | 11.68 | 10.18 | 11.97 | 55.4 | 56.6 | 49.5 | 41.8 |
| No. 4 No. 3 | 18 Reclaimed 12 Fresh | None | None | 70 | 11.68 | 10.84 | 10.26 | 12.01 | 58.1 | 57.7 | 52.7 | 42.5 |
| No. 4 No. 3 | 22.5 Rec. 7.5 Fresh | None | None | 70 | 11.83 | 11.41 | 10.26 | 11.89 | 58.1 | 59.2 | 53.0 | 44.8 |
| No. 4 | 40 | None | None | 60 | 12.20 | 11.28 | 10.46 | 12.10 | 50.8 | 50.9 | 44.4 | 36.4 |
| No. 5 | 20 | 20 | None | 60 | 10.89 | 10.41 | 9.83 | 10.17 | 51.3 | 50.5 | 44.6 | 33.2 |
| No. 4 | 20 | 20 | None | 60 | 10.24 | 10.17 | 11.93 | 12.00 | 49.8 | 49.6 | 46.3 | 30.2 |

TABLE 5-continued
pH VALUES OF WATER SLURRIES OF KILN DUST - FLY ASH - SLUDGE MIXTURES AND MOISTURE CONTENTS OF THESE MIXTURES

| | Percentage of | | | | pH Values of Slurry of 50% by Weight Kiln Dust - Sludge Mixture and 50% by Weight Water | | | | Moisture Content (%) Wet Basis | | | |
|---|---|---|---|---|---|---|---|---|---|---|---|---|
| Source of Kiln Dust | Kiln Dust in Mixture | Trenton Channel Fly Ash in Mixture | Admixture in Mixture | Sludge in Mixture | Initial | 4 Hours | 72 Hours | 7 Days | Initial | 4 Hours | 72 Hours | 7 Days |
| No. 4 | 20 | 20 | 1.5 | 58.5 | 10.45 | 10.20 | 12.03 | 11.99 | 51.0 | 50.3 | 45.1 | 22.8 |
| Sludge only (Oct. 1) | None | None | None | 100 | 6.85 | ND | 7.00 | 7.09 | 85.0 | 83.6 | 81.9 | 76.8 |
| Sludge only (Oct. 5) | None | None | None | 100 | 6.89 | 6.95 | 6.93 | 7.11 | 87.8 | 86.9 | 85.1 | 70.7* |
| No. 6 | 30 | None | None | 70 | 10.19 | 10.27 | 10.36 | 9.63 | 57.3 | 56.9 | 51.0 | 37.1 |
| No. 7 | 30 | None | None | 70 | 11.76 | 11.99 | 11.93 | 12.08 | 58.6 | 58.4 | 52.5 | 39.8 |

ND — Not Determined
*Possibly caused by proximity of drying oven to container of sludge.

TABLE 6
PERCENTAGE CHANGE FROM INITIAL MOISTURE CONTENT OF MIXTURES OF KILN DUST, FLY ASH, AND WASTE WATER TREATMENT SLUDGE FROM DETROIT, MICHIGAN

| | Percentage of | | | | Percentage* Change from Initial Moisture Content, Percent | | |
|---|---|---|---|---|---|---|---|
| Source of Kiln Dust | Kiln Dust in Mixture | Trenton Channel Fly Ash in Mixture | Admixture in Mixture | Sludge in Mixture | 4 Hours | 72 Hours | 7 Days |
| No. 1 | 30 | None | None | 70 | −0.9 | −9.2 | −16.2 |
| No. 2 | 30 | None | None | 70 | −2.1 | −9.0 | −19.5 |
| No. 3 | 30 | None | None | 70 | −1.6 | −10.7 | −22.8 |
| No. 4 | 30 | None | None | 70 | −1.9 | −7.9 | −17.8 |
| No. 4 | 30 | None | 1.5 | 68.5 | +4.8 | −3.9 | −19.7 |
| No. 4 | 30 | None | 2.5 | 67.5 | +2.2 | −12.8 | −24.5 |
| No. 4 No. 3 | 18 Reclaimed 12 Fresh | None | None | 70 | −0.7 | −9.3 | −26.8 |
| No. 4 No. 3 | 22.5 Rec. 7.5 Fresh | None | None | 70 | +1.90 | −8.8 | −22.9 |
| No. 4 | 40 | None | None | 60 | +0.2 | −12.6 | −28.3 |
| No. 5 | 20 | 20 | None | 60 | −1.6 | −13.1 | −35.3 |
| No. 4 | 20 | 20 | None | 60 | −0.4 | −7.0 | −39.4 |
| No. 4 | 20 | 20 | 1.5 | 58.5 | −1.4 | −11.6 | −55.3 |
| Sludge only (Oct. 1) | None | None | None | 100 | −1.6 | −3.6 | −9.6 |
| Sludge only (Oct. 5) | None | None | None | 100 | −1.0 | −3.1 | −19.5 |
| No. 6 | 30 | None | None | 70 | −0.7 | −11.0 | −35.3 |
| No. 7 | 30 | None | None | 70 | −0.3 | −10.4 | −32.1 |

ND — Not Determined
*See Table 5 for moisture contents

The kiln dust from Source No. 1 had the following composition by weight:

| | |
|---|---|
| $SiO_2$ | 15.01% |
| $Al_2O_3$ | 3.90 |
| $Fe_2O_3$ | 2.18 |
| CaO | 41.33 |
| MgO | 2.25 |
| $K_2O$ | 6.94 |
| $Na_2O$ | 0.38 |
| $SO_3$ | 7.41 |
| $CO_2$ | 17.67 |
| $H_2O$ | — |
| LOI | 20.38 |
| Insoluble $SiO_2$ | — |
| $CaO_{free}$ | 4.58 |
| Others | — |

The kiln dust from Source No. 2 had the physical and chemical characteristics as set forth in TABLES 3 and 4 for dust SAMPLE NUMBER LD-2.

The kiln dust from Source Nos. 3 and 4 had the following chemical composition:

| | |
|---|---|
| $SiO_2$ | 15.66% |
| $Al_2O_3$ | 5.91 |
| $Fe_2O_3$ | 4.95 |
| CaO | 36.32 |
| MgO | 2.05 |
| $K_2O$ | 4.53 |
| $Na_2O$ | 0.29 |
| $SO_3$ | 13.47 |
| $CO_2$ | 9.76 |
| $H_2O$ | — |
| LOI | 12.29 |
| Insoluble | 2.18 |
| $CaO_{free}$ | 13.00 |
| Others | 5.50 |

The kiln dust from Source No. 5 had the following chemical composition:

| | |
|---|---|
| $SiO_2$ | 15.90% |
| $Al_2O_3$ | 1.32 |
| $Fe_2O_3$ | 1.73 |
| CaO | 51.32 |
| MgO | 2.18 |
| $SO_3$ | 5.38 |
| Ignition Loss | 23.89 |
| $Na_2O$ | 0.40 |
| $K_2O$ | 1.80 |

The kiln dust from Source No. 6 had the physical and chemical characteristics as set forth in TABLES 1 and 2 for kiln dust SAMPLE NUMBER CD-14.

The kiln dust from Source No. 7 had the following chemical composition:

| | |
|---|---|
| Calcium Oxide, Free Lime | 20.83% |
| CaO | 58.17 |
| MgO | 1.91 |
| Sulfur Trioxide | 5.82 |
| Silicon Dioxide | 6.12 |
| $Fe_2O_3$ | 1.86 |
| $K_2O$ | 0.34 |

EXAMPLE II

Six mixtures of cement kiln dust, fly ash, fine aggregate, and waste water treatment sludge were made for this study. Six additional mixtures were made using additions of various combinations of cement kiln dust, fly ash, and fine aggregate to the sludge. The cement kiln dust had the properties set forth in TABLES 1 and 2, SAMPLE NUMBER CD-14.

Three pound batches were made of each mixture of sludge and addition. The additions were thoroughly blended into the sludge using the paddle attached to the planetary drive of the mixer. The mixer was run at the slow speed (72 rpm) for three minutes.

The mixture were stored in polyethylene jars of one or two quart capacity. These jars had inside diameters of 4.5 inches and top openings 3.4 inches in diameter. The jars were left uncovered to provide access to air.

The initial moisture content was determined on a wet basis for each mixture of sludge and additions. The moisture contents (wet basis) of the sludge from each of two cans of wet sludge and from one can of dry sludge were also determined. The average values of several determinations are reported as the "Initial Moisture Content of Sludge" in TABLE 7.

Because this study was a preliminary one, the moisture contents of the mixtures at seven and 14 days were not measured. Instead, a description is given which estimates the hardness and dryness of the mixture. The degree of granularity is also described.

The dry sludge (51% moisture, wet basis) used in mixtures numbered 9 and 10 could not be broken up into small granules by the action of mixing paddle. It was necessary to break up the large, hard chunks of dry sludge in a mortar and pestle before mixing the dry sludge with the additions.

TABLE 7 lists the weight percentages of each component in the mixtures, and the initial moisture contents (wet basis) of the sludge used in the mixture and of the mixture immediately after blending. Also listed are comments on the degree of granularity of the mixtures, and on the hardness and dryness after 7 and 14 days.

The mixtures using dry sludge (Nos. 9 and 10) granulated very well, probably because they were hard and granular (after crushing with the mortar and pestle) before adding the kiln dust and fly ash.

Most of the mixtures made from wet sludge did not develop any granularity. In the three mixtures which became granular (Nos. 4, 6 and 12) only No. 4 had granules smaller than 3/4 inch. No correlation between granularity and initial moisture content of the mixture can be seen.

Drying, however, appeared to be more rapid for mixtures which contained both cement kiln dust and fly ash than for those mixtures which contained only one of these additions.

TABLE 7

| Mixture No. | Weight Percentages of Components of Mixture (%) | Initial Moisture Content of Sludge (%) | Initial Moisture Content of Mixture (%) | Granularity of Mixture at 7 Days | Estimates of Hardness and of Moisture Content at 7 and 14 Days | |
|---|---|---|---|---|---|---|
| #1 | 33.3% CKD*<br>66.7% Sludge | 78 | 50.4 | None (single large mass) | At 7 Days:<br>At 14 Days: | Soft, still wet<br>Harder, cracks forming in large mass as it dries, somewhat damp |
| #2 | 25% CKD<br>15% FA*<br>10% Aggregate<br>50% Sludge | 78 | 37.0 | None (single large mass) | At 7 Days:<br>At 14 Days: | Rather soft, still damp<br>Harder, quite dry |
| #3 | 30% CKD<br>10% Aggregate<br>60% Sludge | 78 | 48.7 | None (single large mass) | At 7 Days:<br>At 14 Days: | Soft, still wet<br>Harder, quite dry |
| #4 | 15% CKD<br>15% FA<br>10% Aggregate<br>60% Sludge | 78 | 47.5 | Good(¾" to ¼" granules) | At 7 Days:<br>At 14 Days: | Rather soft, still damp<br>Moderately hard but can be broken easily, quite dry |
| #5 | 30% CKD<br>30% FA<br>10% Aggregate<br>30% Sludge | 78 | 23.7 | None (single large mass) | At 7 Days:<br>At 14 Days: | Moderately hard, slightly damp<br>Hard, nearly dry |
| #6 | 35% CKD<br>35% FA<br>30% Sludge | 78 | 24.2 | Coarse (about ¾" granules and one 2½" ball) | At 7 Days:<br>At 14 Days: | Moderately hard, slightly damp<br>Hard, nearly dry |
| #7 | 25% CKD<br>25% FA<br>50% Sludge | 78 | 38.1 | None (single large mass) | At 7 Days:<br>At 14 Days: | Moderately hard, somewhat damp<br>Hard, quite dry |
| #8 | 20% CKD<br>20% FA<br>10% Aggregate<br>50% Sludge | 78 | 37.4 | None (single large mass) | At 7 Days:<br>At 14 Days: | Moderately hard, somewhat damp<br>Hard, quite dry (Mixture #8 appears nearly the same as mixture #7) |
| #9 | 20% CKD<br>20% FA<br>60% Sludge**<br>(Dry) | 51 | 29.2 | Excellent (−#8 mesh) | At 7 Days:<br>At 14 Days: | Moderately hard, quite dry<br>Hard, dry |
| #10 | 10% CKD | 51 | 37.5 | Very Good | At 7 Days: | Moderately hard, quite dry |

TABLE 7-continued

| Mixture No. | Weight Percentages of Components of Mixture (%) | Initial Moisture Content of Sludge (%) | Initial Moisture Content of Mixture (%) | Granularity of Mixture at 7 Days | Estimates of Hardness and of Moisture Content at 7 and 14 Days | |
|---|---|---|---|---|---|---|
| | 10% FA 10% Aggregate 70% Sludge** (Dry) | | | (granules up to ⅛″) | At 14 Days: | Hard, dry |
| #11 | 20% CKD 20% FA 20% Aggregate 40% Sludge | 93 | 37.2 | None (single large mass) | At 7 Days: At 14 Days: | Soft, still damp Harder, moderately dry |
| #12 | 25% FA 25% Aggregate 50% Sludge | 93 | 46.9 | Very Coarse | At 7 Days: At 14 Days: | Soft, still wet Soft, damp |

EXAMPLE III

Five mixtures of waste water treatment sludge and various combinations of cement kiln dust, fly ash, and industrial grade Ca(OH)$_2$ were made and tested. One mixture contained only sludge and cement kiln dust. Two other mixtures contained sludge, cement kiln dust, and fly ash. Two additional mixtures were made of sludge, cement kiln dust, fly ash, and Ca(OH)$_2$. In addition, a control sample of sludge only was tested.

Three pound mixtures of sludge and cement kiln dust (and fly ash and Ca(OH)$_2$ were used) were thoroughly blended using a paddle attached to the planetary drive of the mixer. Mixing time was three minutes. The mixture was placed into waxed cardboard cylinders 6 inches in diameter by 12 inches high. These containers were open at the top to allow some air circulation.

Immediately after mixing, the samples for the initial pH measurement and the initial moisture determination were taken. Additional samples for pH and moisture determination were taken from the storage container at 4, 72 and 168 hours after mixing.

To minimize the strong, objectionable odor associated with the sludge, the waxed containers holding the mixtures and the small oven used to dry the moisture samples were placed inside the large double-door curing oven. The oven had previously been connected to the blower venting the hood. By keeping the doors partially open and the hold blower running, a draft was induced which carried away much of the odor from the open containers and most of the heat from the oven used to dry the moisture samples.

The pH and moisture samples were taken from the cylindrical containers at 4, 72 and 168 hours after mixing. The pH of a slurry of 50% by weight sludge-CKD-F/A mixture and 50% by weight distilled, deionized water was measured. The pH value was recorded after the pH electrode had been immersed in the continuously stirred slurry for five minutes.

About 200 grams of mixture was used for moisture determination. After drying at least two days at 105° C., the moisture contents were calculated on a wet basis by the following formula:

$$\text{Percent Moisture (Wet Basis)} = \frac{\text{Weight of wet sample in container} - \text{Weight of dry sample in container}}{\text{Weight of wet sample in container} - \text{Weight of container}} \cdot 100$$

Table 8 lists the weight percentages of kiln dust, fly ash, calcium hydroxide, and waste water treatment sludge. It also lists the pH values of water slurries of the mixtures and the moisture contents of the mixtures.

The data in Table 8 indicate the cement kiln dust alone is the most effective to drying sludge. Fly ash in the proportions tested does not seem to aid drying, but it does increase the pH at four hours and at seven days.

It can be seen that these tests show the ability of kiln dust, kiln dust/fly ash, kiln dust/fly ash/lime, and kiln dust/lime systems to stabilize and solidify low percentage solids waste water treatment sludge. This technology provides dewatering, stabilization, and solidification in a single process.

TABLE 8

| PERCENTAGE OF | | | | pH Values of Slurry of 50% by Weight Cement Kiln Dust - Fly Ash - Sludge Mixture & 50% by Weight Water | | | | Moisture Content (%) Wet Basis | | | |
|---|---|---|---|---|---|---|---|---|---|---|---|
| Cement Kiln Dust in Mixture | Fly Ash in Mixture | Ca(OH)$_2$ in Mixture | Sludge in Mixture | Initial | 4 Hours | 72 Hours | 7 Days | Initial | 4 Hours | 72 Hours | 7 Days |
| 30 | None | None | 70 | 12.11 | 11.88 | 12.06 | 12.03 | 64.1 | 54.5 | 47.0 | 15.8 |
| 15 | 15 | None | 70 | 11.88 | 12.28 | 11.58 | 12.03 | 61.6 | 58.0 | 51.6 | 20.9 |
| 20 | 20 | None | 60 | 12.04 | 12.23 | 11.83 | 12.32 | 57.8 | 50.7 | 44.8 | 23.3 |
| 15 | 15 | 1 | 69 | 11.98 | 12.35 | 11.93 | 12.28 | 67.4 | 57.4 | 54.4 | 24.7 |
| 15 | 15 | 2 | 68 | 12.07 | 12.38 | 12.26 | 12.47 | 66.7 | 60.5 | 54.3 | 25.9 |
| 0 | 0 | 0 | 100 | 6.48 | 6.58 | 6.42 | 7.23 | 98.0 | 98.0 | 97.7 | 96.3 |

It can be seen that these tests clearly show the ability of kiln dusts to solidify waste water treatment sludge so that it can be granulated and easily spread without emitting fugitive dust or migratory liquids.

I claim:

1. The method of beneficiating waste water sludge to reduce the pathogens which comprises:
    mixing weeds sludge and kiln dust to form a mixture, the mixture comprising from about 10% to about 30% kiln dust by weight and from about 90% to about 70% waste water sludge by weight,
    the amount of kiln dust being sufficient to raise the pH of the mixture to at least 12 and to maintain the pH of the mixture to at least 12 for at least two hours, and permitting the mixture with a pH of at least 12 to interact for at least two hours.

2. The method set forth in claim 1 wherein said kiln dust is selected from the group consisting of cement kiln dust and lime kiln dust.

3. The method set forth in claim 2 including controlling the amount of kiln dust and exposing the mixture at ambient temperature without compacting for a time sufficient to produce a disintegratable, friable product which can be applied to land as a soil conditioner and partial fertilizer.

4. The method set forth in claim 3 including the step of breaking the resultant product to a generally uniform product of small particles.

5. The method set forth in claim 2 including the step of adding a caustic compound to the mixture in an amount not to exceed 15% of the kiln dust.

6. The method set forth in claim 2 including the step of adding dolomitic limestone to the mixture in an amount sufficient to supply magnesium to the soil.

7. The method set forth in claim 2 including the step of partially substituting fly ash for kiln dust.

8. The method set forth in claim 2 wherein the waste water sludge comprises waste water treatment sludge.

9. The method set forth in claim 2 wherein the waste water sludge comprises animal waste.

10. The method set forth in claim 1 wherein said kiln dust comprises cement kiln dust.

11. The method set forth in claim 10 wherein said mixture comprises about 30% cement kiln dust by weight and about 70% waste sludge by weight.

12. The product made in accordance with the method of claim 1.

13. The product set forth in claim 12 wherein the kiln dust is selected from the group consisting of cement kiln dust and lime kiln dust.

14. The product set forth in claim 13 wherein fly ash is partially substituted for kiln dust.

15. The product set forth in claim 13 wherein said product includes a caustic material in an amount not more than 15% by weight of the kiln dust.

16. The product set forth in claim 13 wherein the waste sludge comprises waste water treatment sludge.

17. The product set forth in claim 13 wherein the waste sludge comprises aniimal waste.

18. The product set forth in claim 12 wherein said kiln dust comprises cement kiln dust.

19. The product set forth in claim 18 wherein said mixture comprises about 30% cement kiln dust by weight and about 70% waste sludge by weight.

* * * * *